US005675682A

United States Patent [19]

De Marchi

[11] Patent Number: 5,675,682

[45] Date of Patent: Oct. 7, 1997

[54] PLUG ARRANGEMENT COMPRISING AT LEAST TWO OPTICAL PLUGS

[75] Inventor: Silverio De Marchi, Contra, Switzerland

[73] Assignee: Diamond SA, Losone, Switzerland

[21] Appl. No.: 594,317

[22] Filed: Jan. 30, 1996

[30] Foreign Application Priority Data

Feb. 21, 1995 [CH] Switzerland .............................. 503/95

[51] Int. Cl.[6] ........................................ G02B 6/36

[52] U.S. Cl. .............................. 385/77; 385/76; 385/78; 385/55; 385/56; 385/60; 385/59; 385/139

[58] Field of Search .............................. 385/76, 77, 78, 385/81, 84, 85, 86, 87, 88, 89, 92, 139, 55, 56, 60, 59

[56] References Cited

U.S. PATENT DOCUMENTS

| | | | |
|---|---|---|---|
| 4,762,388 | 8/1988 | Tanaka et al. | 385/70 X |
| 5,123,071 | 6/1992 | Mulholland et al. | 385/53 X |
| 5,157,749 | 10/1992 | Briggs et al. | 385/60 |
| 5,313,540 | 5/1994 | Ueda et al. | 385/78 |
| 5,363,460 | 11/1994 | Marazzi et al. | 385/70 |
| 5,398,295 | 3/1995 | Chang et al. | 385/58 |
| 5,481,634 | 1/1996 | Anderson et al. | 385/76 |
| 5,487,123 | 1/1996 | Fowble | 385/70 |

FOREIGN PATENT DOCUMENTS

| | | | |
|---|---|---|---|
| 616 236 | of 0000 | European Pat. Off. | 385/53 X |
| 597 501 | of 0000 | European Pat. Off. | 385/53 X |
| 94/24592 | of 0000 | WIPO | 385/53 X |

*Primary Examiner*—Brian Healy
*Attorney, Agent, or Firm*—Shoemaker and Mattare, Ltd

[57] ABSTRACT

The plug arrangement (1) has two individual plugs (2, 2') that can be extracted solely by actuating a single release lever (3). At the same time, this release lever connects combines the plugs to a duplex plug unit. To improve axis parallelity. a connecting element (6) is additionally snapped onto both the plugs.

10 Claims, 3 Drawing Sheets

3
32
31
12
1
31'
12'
5
10
11
14
16
13
4
29
7
2
2'
8
9
30
6
28
8'

3
32
31
12
1
5
12'
31'
10
11
14
16
13
4
29
7
2
2'
8
9
30
6
28
8'

PLUG ARRANGEMENT COMPRISING AT LEAST TWO OPTICAL PLUGS

BACKGROUND OF THE INVENTION

The invention concerns a plug arrangement comprising at least two optical plugs. These so-called duplex plugs are often used where two optical fibres require simultaneous connection. To ensure transmission of light at the plug connector with the minimum attenuation, it is at the same time very important that both individual plugs are not connected in a completely rigid way, but that each plug can carry out a limited relative movement.

For the connection of two separate plugs to a duplex plug arrangement, there are already various embodiments of push-pull type plug connectors complying with international SC standard type-classification. According to WO-94/24 592, at least one clip is snapped onto both the plug housings, said clip grasping each plug housing individually, and possessing a bow-shaped connecting bridge-piece between both individual clips. According to U.S. Pat. No. 5,123,071, the connection comprises two shackles which can be snapped together and which grasp both plugs in order to clamp them together. In EP-A-597 501, direct connection of both plug housings of the individual plugs without auxiliary means has also been disclosed.

The push-pull type plug has the disadvantage that a tension force must be exerted on the plug housing in order to once again release the plug connection. Individual plugs, as already disclosed in EP-A-616 236, for example, indeed exist wherein the plug connection is released with the aid of a release lever. These plugs could indeed be connected to a duplex unit using conventional connecting clips, but still require individual actuation of each release lever.

SUMMARY OF THE INVENTION

It is thus a purpose of the invention to create an arrangement of plugs of the aforementioned type with which plug-lock can be released within the sleeve without the application of tension force and by means of a single grip. According to the invention, this purpose is fulfilled by a plug arrangement as described below.

Both individual plugs are provided with an engagement device that can be released with only one release lever. This release lever, however, fulfils a double function in that it also serves as a connecting device between the two plugs. Through actuation of the common release lever, the engagement devices on the separate plugs will be simultaneously released. Since the release lever is mounted to be able to move relative to each plug, there will nevertheless be no completely rigid connection. Preferably, the release lever is a pivoting lever that is mounted to be able to pivot on a common axis running at a right angle to the axes of the plugs. Fitting is at the same time facilitated if the pivoting lever is mounted on each plug with in each case two linkage protrusions. A separate pin would also be conceivable, however, inserted to extend through both plugs.

Theoretically, the common pivoting lever is sufficient for the connection of both individual plugs in such a way that they can always be inserted as a pair into a corresponding sleeve arrangement. In order to stabilise the parallelism of the axes, it is, however, particularly advantageous if the connecting device possesses an additional connecting element. Here, the additional connecting element can be a connecting clip that can be snapped onto an accommodating section on both the plugs.

Preferably, the connecting clip has two U-shaped clip sections, wherein a distance body is arranged between the clip sections, said distance distance body lying between the two plugs. To a certain degree, this distance body serves to maintain the parallelism of both the plugs. Additionally, it will improve the grip when handling the plug arrangement.

In order to increase elasticity, the distance body can be formed as a hollow body.

A particularly advantageous arrangement will arise if the common pivoting axis of the release lever lies on the same or approximately the same plane as both the clip sections of the connecting element. With that, the connecting clip is snapped onto the plug on the side opposite to the release lever. If the distance body is extended towards the cable-side portion of the plug, it will also be ensured that particulary this relatively flexible end-portion, which normally possesses a kink-protector, will be held parallel.

BRIEF DESCRIPTION OF THE DRAWINGS

Further advantages and individual features of the invention will arise from the following description of an embodiment, and from the drawings: namely.

DESCRIPTION OF THE PREFERRED EMBODIMENT

Figure 1:
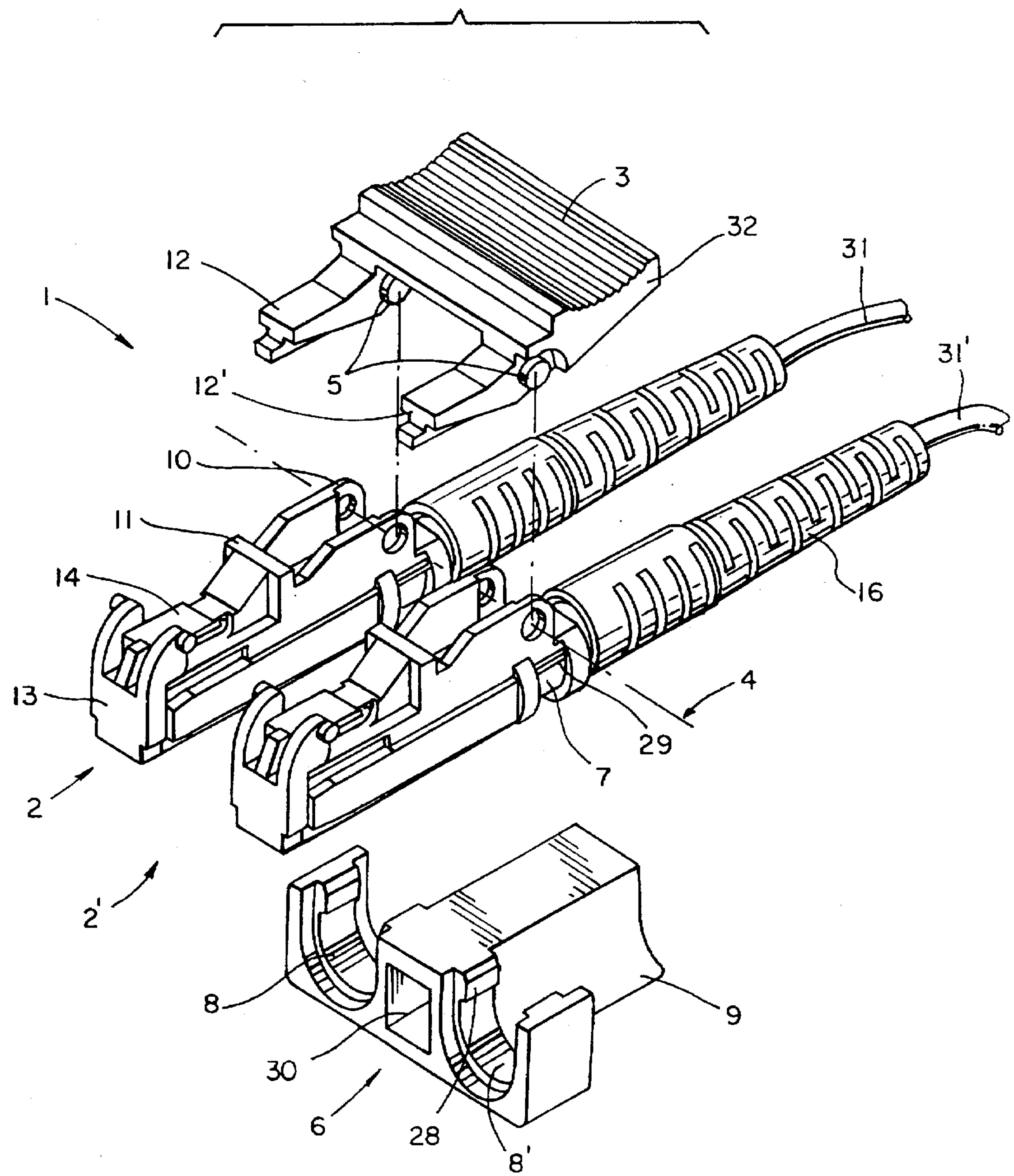
FIG. 1 a perspective drawing of a plug arrangement prior to assembly.

FIG. 1 shows a general plug arrangement 1, comprising both individual plugs 2 and 2', a common release lever 3 that extends across the upper side of both plugs, and a connecting element 6 that is snapped onto both the plugs from below.

Figure 4:
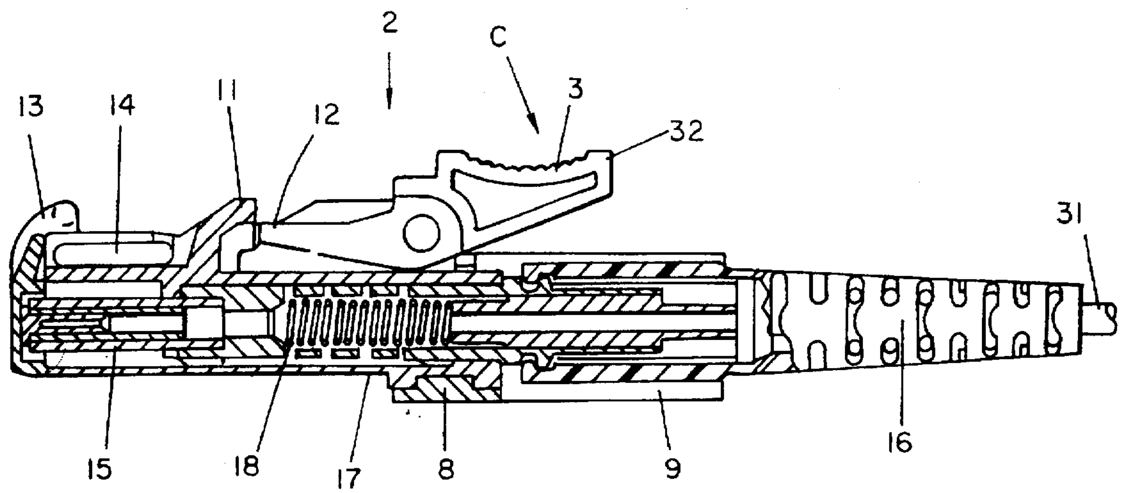

Further details about the construction of the plug 2 and 2' can be seen in FIG. 4. Apart from that, the aforementioned EP-A-616 236, which describes this type of engagement device in detail, should be referred to. A plug ferrule 15 is mounted in the plug housing 17, said plug ferrule being loaded in the axial direction by a spring arrangement 18. The optical fibre cable 31 is inserted into the plug housing through a kink-protector 16, with the optical fibre (not shown here) being gripped centrally within the plug ferrule 15.

The facing side of the plug 2 is covered by a protective flap 13. This protective flap can pivot outwards on a protective flap bearing 14. A locking bar 11 serves as a lock within the sleeve, and is integrated into the plug housing. Lateral bearing elements 10 form a kind of forked bearing for accommodation of the release lever 3.

The release lever 3 comprises a grip portion 32 that is corrugated on its upper side. Two separate pivoting arms 12 and 12' are so arranged that they extend along each plug until directly behind the locking bar 11. A linkage protrusion 5 is arranged on each side of a pivoting arm. These linkage protrusions can engage into the openings on the bearing elements 10. In the assembled position, the release lever 3 can pivot around a common axis 4. This axis runs at a right angle to the mean longitudinal axis of both the plugs 2 and 2'.

On approximately the same vertical plane as the common axis 4, the outside of each plug housing 17 is provided with an accommodation section 7. On each side, each accommodation section is, with that, provided with a bar 29 running parallel to the axis of the plug.

The additional connecting element 6 is snapped onto the accommodation section 7. In principle, the connecting element 6 comprises two U-shaped clip sections 8 and 8', between which a distance body 9 is arranged. The clip sections 8 are, at the upper end of the U-bracket, provided with inclined protrusions 28. These protrusions engage behind the bars 29 on the accommodation section 7. A hollow space 30 extends over the entire length of the distance body 9. The sidewalls of the distance body are slightly curved, and are thus adjusted to the end-section of both plugs. The height of the distance body is slightly greater than the diameter of said end-sections, as can be particulary seen in FIG. 4.

Figure 2:
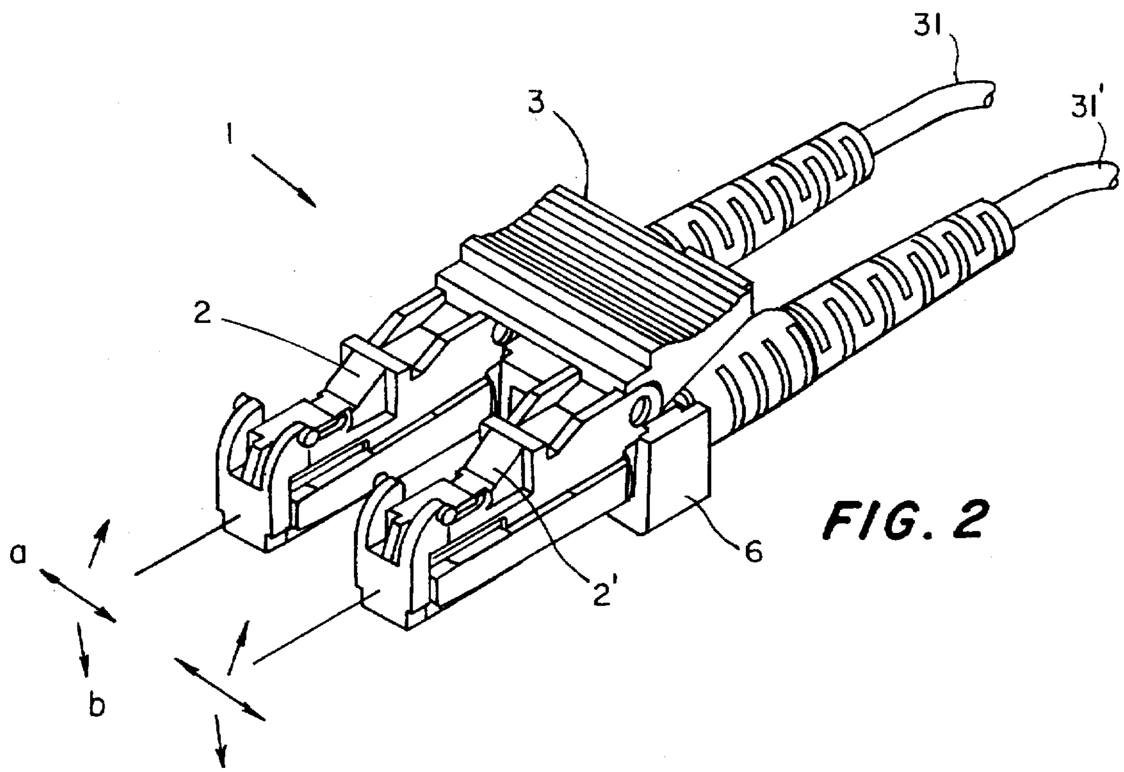
FIG. 2 a plug arrangement according to FIG. 1 in an assembled condition, FIG. 3 a sleeve arrangement for the plug arrangement according to FIG. 2, FIG. 4 a longitudinal section through the plug arrangement according to FIG. 2, and FIG. 5 a longitudinal section through the sleeve arrangement according to FIG. 3.

The assembled plug arrangement 1 forms a compact and handy unit wherein the release mechanism can be actuated by means of a single grip. As shown in FIG. 2, both the separate plugs 2 and 2' can carry out slight relative movements in the direction of the arrows a and b. This is required for insertion into the associated sleeve arrangement 19 under minimum tension.

Figure 3:
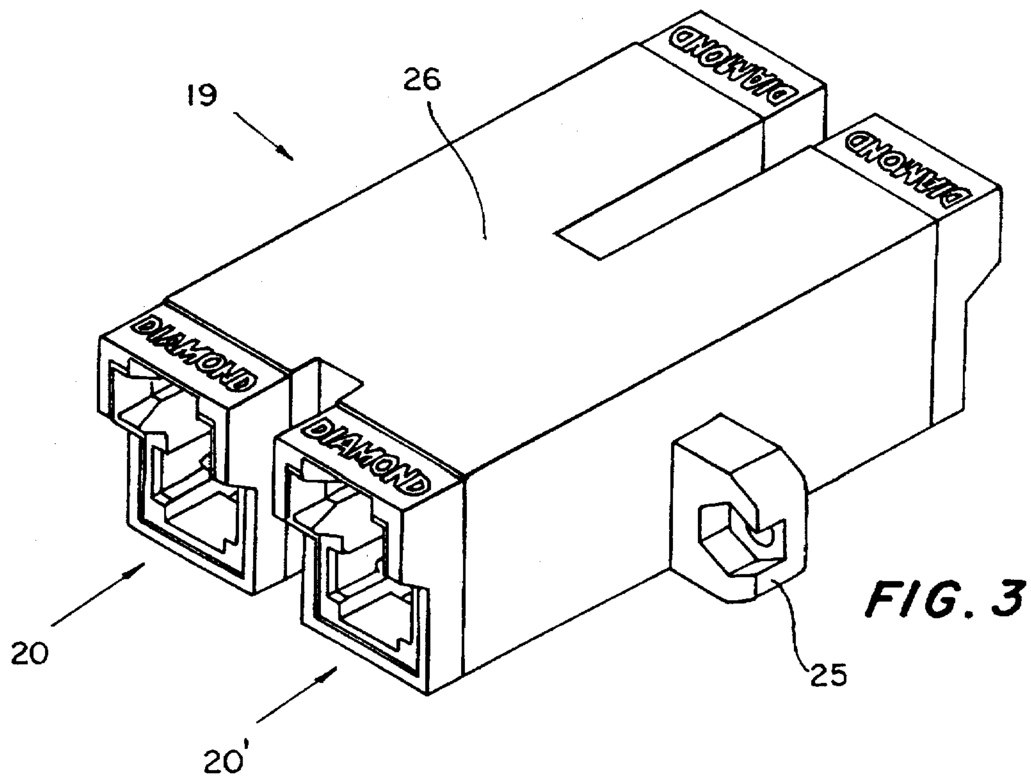

According to FIG. 3, this type of sleeve arrangement comprises both the sleeves 20 and 20', connected together in one piece by a bridge of material 26. An attachment flange 25 is arranged on each side, by which the sleeve arrangement can be affixed to a housing wall, for example.

Figure 5:
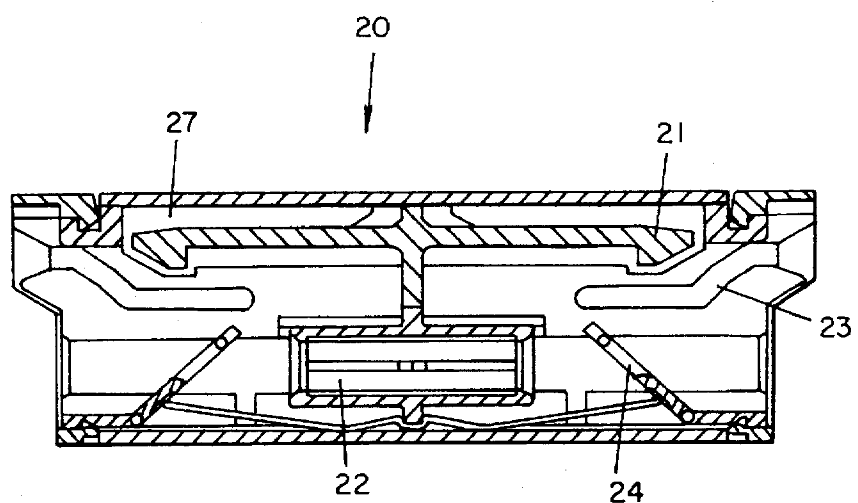

Details of a sleeve can be seen in FIG. 5, in which respect EP-A-616 236 can likewise be referred to.

On each plug side, a spring locking catch is arranged within the sleeve housing 27. On reaching the final plugged position, this locking catch will engage behind the locking bar 11 on the plug. On insertion, a guide 23 will open the protective cap 13 on the facing side of the plug, so that the plug ferrule 15 can penetrate a centralising sleeve 22. On insertion, a spring mounted screen 24 will be flapped downwards. In order to release the engagement device, pressure on the plug arrangement is exerted on the grip 32 in the direction of the arrow c (FIG. 4). With that, both pivoting arms 12 and 12' will raise the locking catches 21 allocated to the individual plugs into a position above the locking bars 11, and the plug arrangement can be extracted using a normal tension force, in which case only the friction between the individual components must be overcome.

Naturally, the release lever 3 could also possess another configuration. Depending on the type of engagement device, it could be a lever that carries out a linear movement instead of a pivoting movement. The additional connecting element, too, does not of necessity require the form of a connecting clip. Here, this could be an element that makes contact with both plug housings in another way. In certain cases, it would be conceivable to employ a similar method to connect more than two plugs and thus form a single plug arrangement on which the engagement device can be released with a single release lever. The plug housing, the release lever and the connecting element are preferably of a plastic material. A metal version is also conceivable.

Inasmuch as the invention is subject to modifications and variations, the foregoing description and accompanying drawings should not be regarded as limiting the invention, which is defined by the following claims and various combinations thereof:

I claim a:

1. Plug arrangement (1) comprising at least two optical plugs (2, 2') connected at a distance to each other by means of a connecting device to form a plug unit, each of said plugs comprising and engagement device for pull resistant engagement within a sleeve portion, said connecting device being a common release lever (3) extending across both plugs (2, 2') and attached to each plug to be able to move in order to release the engagement devices.

2. Plug arrangement according to claim 1, wherein the release lever is a pivoting lever that is mounted on both plugs to be able to pivot about a common axis (4), said axis running at right angles to the plug axes.

3. Plug arrangement according to claim 2, wherein the pivoting lever is mounted on each plug, with in each case two linkage protrusions (5).

4. Plug arrangement according to one of the claims 1, wherein, for stabilisation of axis parallelism, the connecting device possesses an additional connecting element (6).

5. Plug arrangement according to claim 4, wherein the additional connecting element is a connecting clip that can be snapped onto accommodation sections (7) on both plugs (2, 2').

6. Plug arrangement according to claim 5, wherein the connecting clip possesses two U-shaped clip sections (8, 8'), and that a distance body (9) is arranged between said clip sections, said distance body lying between both plugs.

7. Plug arrangement according to claim 6, wherein the distance body (9) is formed as a hollow body.

8. Plug arrangement according to claim 6, wherein the common axis (4) lies on the same or almost the same plane as the clip sections (8, 8'), and that the connecting clip is snapped onto the side of the plugs (2, 2') lying opposite the release lever (3).

9. Plug arrangement according to claim 8, wherein the distance body (9) extends towards the cable-side end portion of the plug.

10. Plug arrangement according to claim 2, characterized in that the common axis (4) lies on the same or almost the same plane as the clip sections (8, 8'), and that the connecting clip is snapped onto the side of the plugs (2, 2') lying opposite the release lever (3).

* * * * *